(12) United States Patent
Moore et al.

(10) Patent No.: US 11,408,106 B2
(45) Date of Patent: Aug. 9, 2022

(54) COUNTING CROCHET HOOK

(71) Applicant: Counting Crochet Hook, L.L.C., Syracuse, UT (US)

(72) Inventors: Braeden Moore, Syracuse, UT (US); Chandra Moore, Syracuse, UT (US); Timothy Hayford, Bountiful, UT (US)

(73) Assignee: COUNTING CROCHET HOOK, L.L.C., Syracuse, UT (US)

( * ) Notice: Subject to any disclaimer, the term of this patent is extended or adjusted under 35 U.S.C. 154(b) by 97 days.

(21) Appl. No.: 16/516,081

(22) Filed: Jul. 18, 2019

(65) Prior Publication Data

US 2020/0024777 A1 Jan. 23, 2020

Related U.S. Application Data

(60) Provisional application No. 62/699,940, filed on Jul. 18, 2018.

(51) Int. Cl.
| | | |
|---|---|---|
| *D04B 37/00* | (2006.01) | |
| *D04B 3/00* | (2006.01) | |
| *D04B 31/00* | (2006.01) | |
| *D04B 33/00* | (2006.01) | |
| *D04B 3/02* | (2006.01) | |
| *G06F 9/451* | (2018.01) | |
| *H04W 4/38* | (2018.01) | |

(52) U.S. Cl.
CPC ............... *D04B 37/00* (2013.01); *D04B 3/00* (2013.01); *D04B 31/00* (2013.01); *D04B 33/00* (2013.01); *G06F 9/453* (2018.02); *H04W 4/38* (2018.02); *D04B 3/02* (2013.01)

(58) Field of Classification Search
CPC .......... D04B 37/00; D04B 33/00; D04B 3/00; D04B 3/02; D04B 31/00; G06F 9/453; H04W 4/38
USPC .......... 66/1 R, 1 A, 116, 117, 118, 119–124; 700/141, 131, 112, 13
See application file for complete search history.

(56) References Cited

U.S. PATENT DOCUMENTS 2,465,636 A * 3/1949 Doerr ...................... D04B 3/00
  66/118
4,107,953 A * 8/1978 Casillo ................... D04B 33/00
  112/169

(Continued)

FOREIGN PATENT DOCUMENTS

DE          4012127 A1 * 10/1990   ............... D04B 3/02

*Primary Examiner* — Danny Worrell
*Assistant Examiner* — Aiying Zhao
(74) *Attorney, Agent, or Firm* — Kunzler Bean & Adamson, PC

(57) ABSTRACT

Apparatuses, systems, and methods are disclosed for a counting crochet hook. An apparatus comprises a handle. The apparatus includes an elongate rod comprising a first end and second end, the first end coupled to the handle and the second end comprising a hook that is pointed with a lateral groove behind the hook. The apparatus further comprises a first button disposed on the handle. The first button is configured to increment a first counter when actuated. The apparatus additionally comprises a second button disposed on the handle. The second button is configured to increment a second counter when actuated. The apparatus also comprises a display disposed on the handle for displaying a value of the first counter and a value of the second counter.

19 Claims, 10 Drawing Sheets

(56) References Cited

U.S. PATENT DOCUMENTS

| | | | | |
|---|---|---|---|---|
| 4,343,160 A | * | 8/1982 | Ponthus born Turquet | ................ D04B 3/02 66/1 A |
| 4,470,273 A | * | 9/1984 | Rogers | ................ D04B 3/00 116/312 |
| 6,145,152 A | * | 11/2000 | Ward | ................ A46B 7/04 132/323 |
| 7,574,876 B2 | * | 8/2009 | Goldschmidt | ................ D04B 3/02 66/1 A |
| 2007/0076409 A1 | * | 4/2007 | Boesch | ................ D04B 33/00 362/109 |
| 2008/0003546 A1 | * | 1/2008 | Dunbar | ................ G09B 19/20 434/95 |
| 2010/0050697 A1 | * | 3/2010 | Barry | ................ B26B 11/00 66/1 A |
| 2012/0296465 A1 | * | 11/2012 | Felice | ................ D04B 3/00 700/141 |
| 2018/0016716 A1 | * | 1/2018 | Christian | ................ D04B 3/00 |

* cited by examiner

COUNTING CROCHET HOOK

CROSS-REFERENCES TO RELATED APPLICATIONS

This application claims the benefit of U.S. Provisional Patent Application No. 62/699,940 entitled COUNTING CROCHET HOOK and filed on Jul. 18, 2018, for Braeden Moore, which is incorporated herein by reference.

FIELD

This invention relates to crochet hooks and more particularly relates to a crochet hook with internal counters for tracking row and stitch counts while crocheting.

BACKGROUND

A problem among people who crochet is being able to keep count of rows without having to stop crocheting, even if for just a moment. Some devices keep count but are not integrated into the crochet hook. For example, a count device may sit next to the user, may be placed on a necklace, or may be attached to the finger of the user. These devices require the user to pause or stop crocheting to click or turn the counter on the device.

SUMMARY

The subject matter of the present application has been developed in response to the present state of the art, and in particular, in response to the shortcomings of conventional crochet hooks that have not yet been fully solved by currently available techniques. Accordingly, the subject matter of the present application has been developed to provide a crochet hook that tracks a user's row and stitch position in a crochet pattern, and corresponding methods, that overcome at least some of the above-discussed shortcomings of prior art techniques.

Disclosed herein is an apparatus. The apparatus comprises a handle. The apparatus also comprises an elongate rod comprising a first end and second end, the first end coupled to the handle and the second end comprising a hook that is pointed with a lateral groove behind the hook. The apparatus further comprises a first button disposed on the handle. The first button is configured to increment a first counter when actuated. The apparatus additionally comprises a second button disposed on the handle. The second button is configured to increment a second counter when actuated. The apparatus also comprises a display disposed on the handle for displaying a value of the first counter and a value of the second counter. The preceding subject matter of this paragraph characterizes example 1 of the present disclosure.

The apparatus further comprises a third button disposed on the handle, the third button configured to release the elongate rod from the handle, the handle configured to receive various elongate rods each with a different hook on the second end. The preceding subject matter of this paragraph characterizes example 2 of the present disclosure, wherein example 2 also includes the subject matter according to example 1, above.

The first button is disposed on a top side of a handle and the second button is disposed substantially opposite the first button on a bottom side of the handle. The preceding subject matter of this paragraph characterizes example 3 of the present disclosure, wherein example 3 also includes the subject matter according to any one of examples 1-2, above.

The apparatus further comprises a hardware device disposed within the handle and electrically coupled to the first button, the second button, and the display, the hardware device configured to dynamically update the display with the values of the first and second counters in response to actuation of one of the first button and the second button. The preceding subject matter of this paragraph characterizes example 4 of the present disclosure, wherein example 4 also includes the subject matter according to any one of examples 1-3, above.

The hardware device is configured to reset the second counter in response to actuation of the first button. The preceding subject matter of this paragraph characterizes example 5 of the present disclosure, wherein example 5 also includes the subject matter according to example 4, above.

The apparatus further comprises a battery disposed within the handle and electrically coupled to the display and the hardware device for powering the display and the hardware device. The preceding subject matter of this paragraph characterizes example 6 of the present disclosure, wherein example 6 also includes the subject matter according to any one of examples 4-5, above.

The hardware device cuts power from the battery to the display and the hardware device after a predefined period of inactivity. The preceding subject matter of this paragraph characterizes example 7 of the present disclosure, wherein example 7 also includes the subject matter according to example 6, above.

The hardware device stores the values in the first and second counters in non-volatile storage prior to power from the battery being cut, the stored values being accessed and presented on the display in response to the display being activated. The preceding subject matter of this paragraph characterizes example 8 of the present disclosure, wherein example 8 also includes the subject matter according to any one of examples 4-7, above.

The hook comprises a crochet hook configured to interlock strands of material in rows of stitches according to a predefined pattern. The preceding subject matter of this paragraph characterizes example 9 of the present disclosure, wherein example 9 also includes the subject matter according to any one of examples 1-8, above.

The first counter is configured to track a current row number of the predefined pattern and the second counter is configured to track a current stitch of the current row. The preceding subject matter of this paragraph characterizes example 10 of the present disclosure, wherein example 10 also includes the subject matter according to example 9, above.

The apparatus further comprises one or more sensors for tracking movements of the hook, wherein the row counter and/or the stitch counter are updated based on the movements of the hook. The preceding subject matter of this paragraph characterizes example 11 of the present disclosure, wherein example 1 also includes the subject matter according to any one of examples 1-10, above.

Further disclosed herein is a system. The system comprises a crochet apparatus. The crochet apparatus comprises a handle. The crochet apparatus also comprises an elongate rod comprising a first end and second end, the first end coupled to the handle and the second end comprising a hook that is pointed with a lateral groove behind the hook. The crochet apparatus further comprises a first button disposed on the handle. The first button is configured to increment a row counter when actuated, the row counter configured to track a row number. The crochet apparatus additionally comprises a second button disposed on the handle. The second button is configured to increment a stitch counter when actuated, the stitch counter configured to track a stitch number of the row. The crochet apparatus also comprises a display disposed on the handle for displaying a value of the row counter and a value of the stitch counter. The system also comprises a computing device communicatively coupled to the crochet apparatus over a data network. The preceding subject matter of this paragraph characterizes example 12 of the present disclosure.

The data network comprises a wireless communication network between the crochet apparatus and the computing device, the wireless communication network comprising a local wireless network, e.g., a BLUETOOTH® network. The preceding subject matter of this paragraph characterizes example 13 of the present disclosure, wherein example 13 also includes the subject matter according to example 12, above.

The system further comprises a pattern module that receives, at the computing device, a predefined crochet pattern defining the rows and stiches in each row for the crochet pattern, and presents the crochet pattern on the computing device for a user to view and follow while crocheting the predefined pattern. The preceding subject matter of this paragraph characterizes example 14 of the present disclosure, wherein example 14 also includes the subject matter according to any one of examples 12-13, above.

The system further comprises an instruction module that provides audio and/or video instructions to the user using the computing device for completing the predefined crochet pattern. The preceding subject matter of this paragraph characterizes example 15 of the present disclosure, wherein example 15 also includes the subject matter according to example 14, above.

The instruction module receives the values of the row counter and the stitch counter and based on the values of the row counter and the stitch counter, provides instructions for completing the next stitch in the predefined crochet pattern. The preceding subject matter of this paragraph characterizes example 16 of the present disclosure, wherein example 16 also includes the subject matter according to example 15, above.

The system further comprises a tracking module that tracks the user's rate of completing a stitch for the predefined crochet pattern based on when the row counter and/or the stitch counter is updated. The preceding subject matter of this paragraph characterizes example 17 of the present disclosure, wherein example 17 also includes the subject matter according to any one of examples 14-16, above.

Based on the user's rate of completing a stitch, the tracking module estimates an amount of time for the user to complete the predefined crochet pattern. The preceding subject matter of this paragraph characterizes example 18 of the present disclosure, wherein example 18 also includes the subject matter according to example 17, above.

The tracking module, based on the values of the row counter and the stitch counter, determines and presents how many stitches are remaining to complete the current row of the predefined crochet pattern. The preceding subject matter of this paragraph characterizes example 19 of the present disclosure, wherein example 19 also includes the subject matter according to any one of examples 17-18, above.

Additionally, disclosed herein is a crochet hook device. The crochet hook device comprises a handle. The crochet hook device also comprises an elongate rod comprising a first end and second end, the first end coupled to the handle and the second end comprising a hook that is pointed with a lateral groove behind the hook. The crochet hook device further comprises a first button disposed on the handle. The first button is configured to increment a first counter when actuated. The crochet hook device additionally comprises a second button disposed on the handle. The second button is configured to increment a second counter when actuated. The crochet hook device also comprises a display disposed on the handle for displaying a value of the first counter and a value of the second counter. The crochet hook device further comprises a third button disposed on the handle, the third button configured to release the elongate rod from the handle, the handle configured to receive various elongate rods each with a different hook on the second end. The crochet hook device additionally comprises a third button disposed on the handle. The third button is configured to release the elongate rod from the handle, the handle configured to receive various elongate rods each with a different hook on the second end. The crochet hook device also comprises a hardware device disposed within the handle and electrically coupled to the first button, the second button, and the display, the hardware device configured to dynamically update the display with the values of the first and second counters in response to actuation of one of the first button and the second button. The crochet hook device further comprises a battery disposed within the handle and electrically coupled to the display and the hardware device for powering the display and the hardware device. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
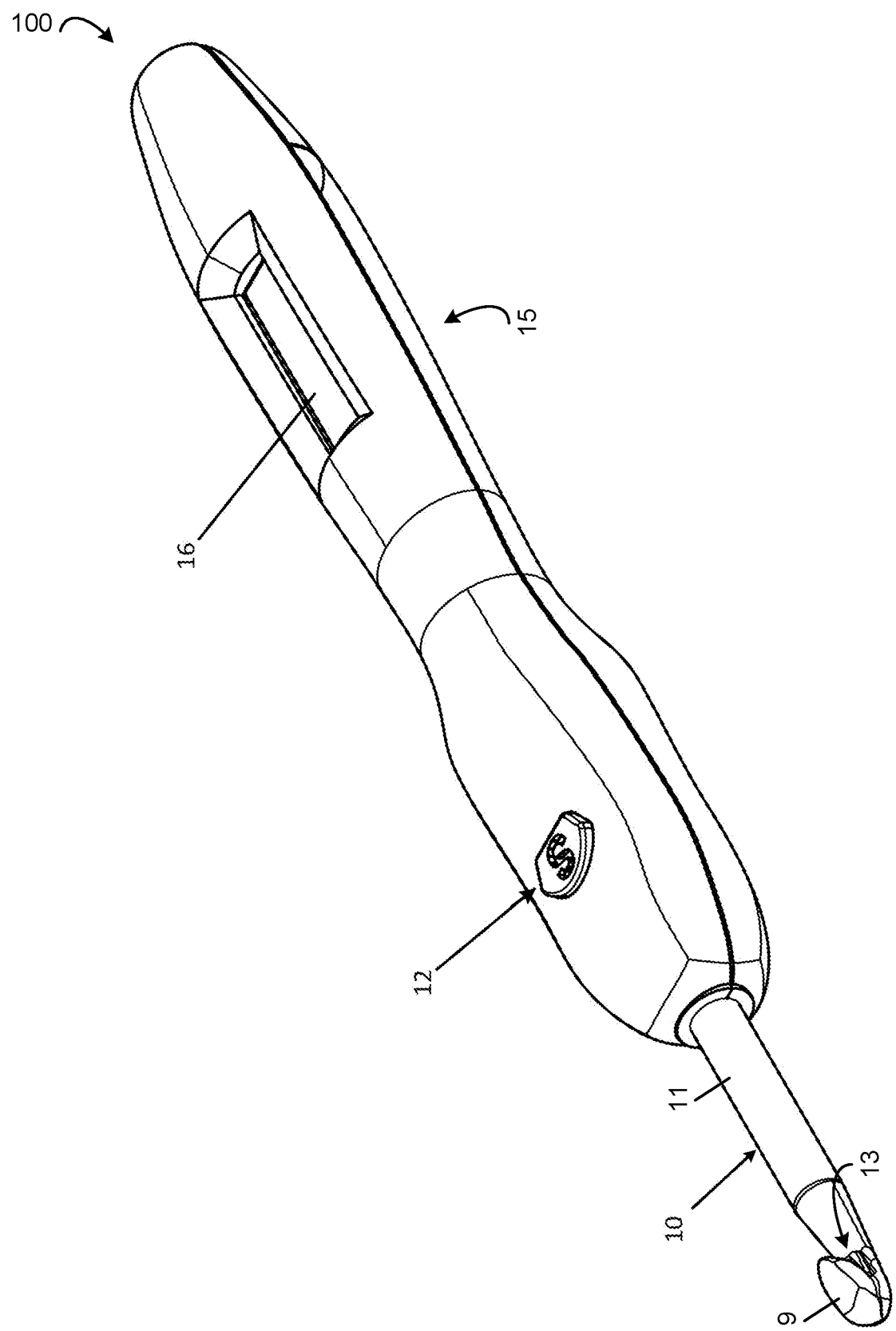
FIG. 1A depicts an elevated view of a top side of an embodiment of a crochet hook in accordance with the subject matter disclosed herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A problem among people who crochet is being able to keep count of rows without having to stop crocheting, even if for just a moment. Some devices keep count but are separate from the crochet hook. For example, the device may sit next to the user, on a necklace, or attached to the finger of the user. These devices require the user to pause or stop crocheting to click or turn the counter on the device.

The subject matter disclosed herein, however, has counters that are integrated into the crochet hook. As described in more detail below, a user can click buttons positioned on the crochet hook handle where most users grip with their thumb and fingers. Accordingly, the buttons are positioned on the crochet hook at locations where the user's thumb and fingers are likely touching the buttons, or very near to them, so that the user can actuate them to keep track of row and stitch counting.

FIG. 1A depicts an elevated view of a top side of a crochet hook 100 assembled from various components. As used herein, a crochet hook 100 is an implement used to make loops in thread or yarn and to interlock them into crochet stitches. In one embodiment, the crochet hook 100 includes an elongate member 10 that includes a shaft 11. The elongate member 10 may include a hook 9 that is pointed on one end with a lateral groove 13 behind it. The hook 9 may have various sizes and may be made of various substantially rigid materials such as plastic, wood, or metal.

In one embodiment, the crochet hook 100 may include a handle 15. The handle 15 may be comprised of a substantially rigid material, such as plastic, metal, wood, or the like, and may be configured to be held comfortably in a user's hand, fingers, or the like. In one embodiment, the handle 15 may include a display 16, such as a liquid crystal display screen, for displaying information such as the current row count and current stitch count for the current row of a crochet project or pattern.

In some embodiments, the handle 15 includes a stitch button 12 for incrementing or decrementing a stitch counter, which tracks the number of stitches for a current row in a crochet pattern, and which may be displayed on the display 16. The stitch counter may include a digital stitch counter that is managed by a hardware device, described below, that is coupled to the display 16 such that the value for the stitch counter can be presented on the display 16. There may be a button cover on the upper side labeled "S" for stitch. In certain embodiments, the elongate member 10 and the handle 15 may be formed as a single piece of the same material, e.g., plastic. In other embodiments, the elongate member 10 and the handle 15 are separate pieces that are coupled together.

Figure 1B:
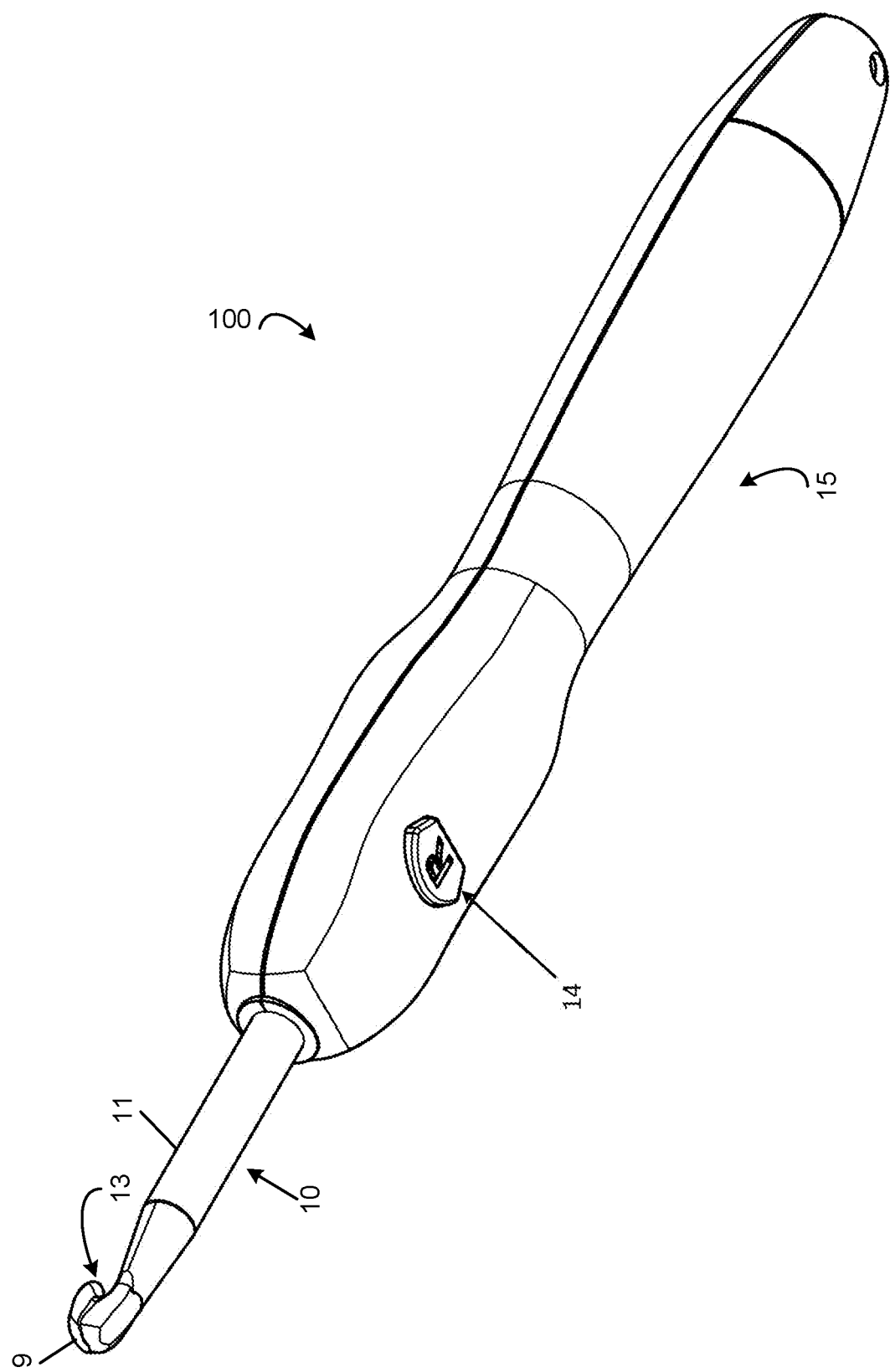
FIG. 1B depicts an elevated view of a bottom side of an embodiment of a crochet hook in accordance with the subject matter disclosed herein.

FIG. 1B depicts an elevated view of a bottom side of a crochet hook 100 assembled from various components. The crochet hook 100 depicted in FIG. 1B may be substantially similar to the crochet hook 100 depicted in FIG. 1A. In addition, the crochet hook 100 of FIG. 1B includes a row button 14 for on the handle 15 for incrementing or decrementing the current row counter, which may be displayed on the display 16. As with the stitch counter, the current row counter may be a digital counter that is managed by a hardware device that is coupled to the display 16 such that the value for the row counter can be presented on the display 16. There may be a button cover on the bottom side labeled "R" for row. In some embodiments, pressing the row button 14 to increment the row counter causes the stitch counter presented on the display 16 to be reset, e.g., back to zero because it begins the stitch counter anew for the next row. In this manner, a user can easily track and view the current row and stitch for the row by simply pressing the stitch and row buttons as they progress through a crochet pattern.

As mentioned above, the stitch counter and the row counter are incremented in response to pressing the stitch button 12 and the row button 14, respectively. In certain embodiments, however, the stitch and row counters can be decremented based on certain interactions with the buttons 12, 14. For instance, a stitch counter may be decremented in response to a user pressing and holding the stitch button 12 for a predefined period of time, e.g., one or two seconds; in response to a user pressing the stitch button in a predefined pattern, e.g., two successive button presses, a long press and then a short press, or the like; and/or the like. In certain embodiments, pressing the stitch and row buttons 12, 14 together resets the stitch and row counters, turns the display off (e.g., if pressed for a longer period of time), and/or the like.

Figure 2:
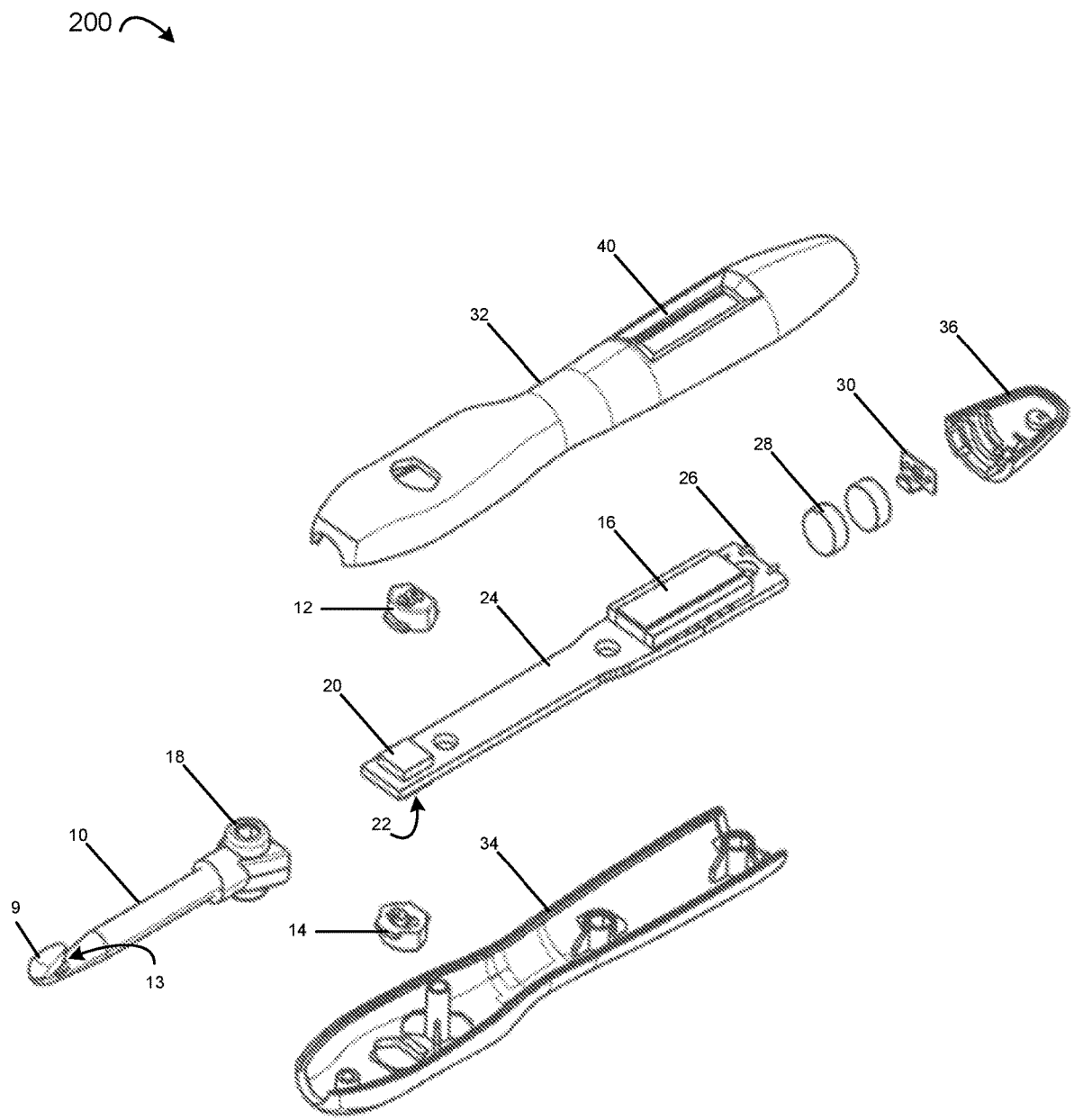
FIG. 2 depicts an exploded view of an embodiment of a crochet hook in accordance with the subject matter disclosed herein.

FIG. 2 depicts an exploded view 200 of a crochet hook 100 to show the interior components that comprise the crochet hook 100. The first end of the elongate member 10, opposite the second end comprising the hook 9, is coupled to an interior holder piece 18 to secure the elongate member 10 to the handle 15. The display 16 may be mounted to a printed circuit board 24. The forward battery contact 26 may be coupled to the printed circuit board 24, integrated circuit, or the like. One or more batteries 28 may be located behind the printed circuit board 24. The batteries may be standard consumer battery such as a "double-A" or "triple-A" battery, a coin or button battery, and/or the like. In certain embodiments, described below, the battery comprises a rechargeable battery that is integrated with the crochet hook 100 or otherwise located within the sealed handle 15.

The back battery contact 30 may be located behind the batteries 28 and secures the batteries 28 in place using spring tension, or the like. The outer shell of the handle 15 is comprised of two halves or sides—an upper half/top side 32, which may include a window 40 for the display 16, and a lower half/bottom side 34, which may not extend the entire length of the handle 15, but extends to the battery compartment door 36. The battery compartment door 36 may slide into place and be secured with a screw, friction fit, or the like, to the upper half 32 of the handle 15.

The printed circuit board 24, on a top side, includes a first button 20 for incrementing or decrementing the stitch counter when the stitch button 12 is actuated. Similarly, the printed circuit board 24 includes a second button 22 on the bottom side for incrementing or decrementing the row counter when the row button 14 is actuated.

Figure 3A:
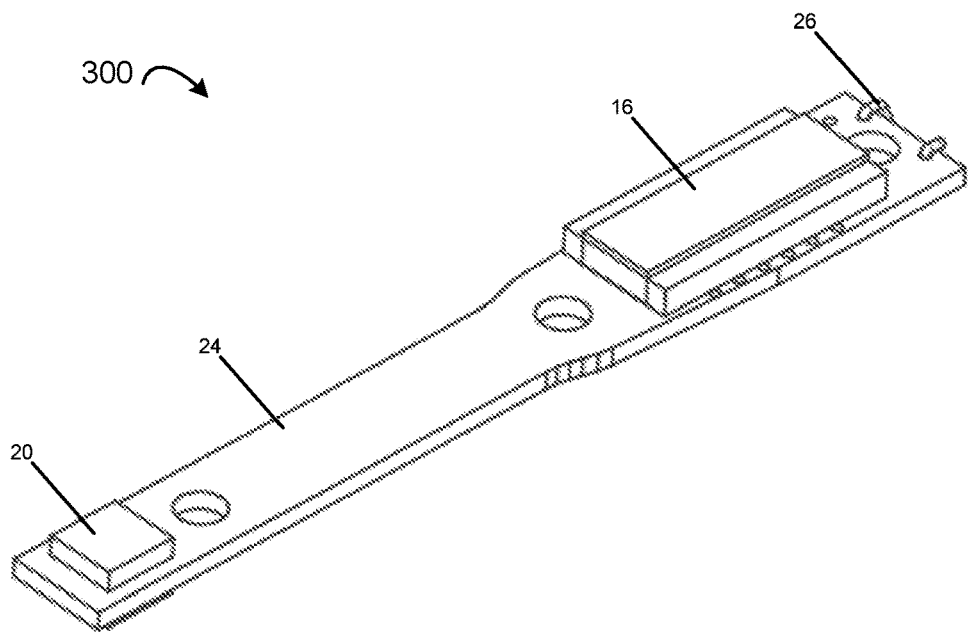
FIG. 3A depicts a top view of the electronics of an embodiment of a crochet hook in accordance with the subject matter disclosed herein.
Figure 3B:
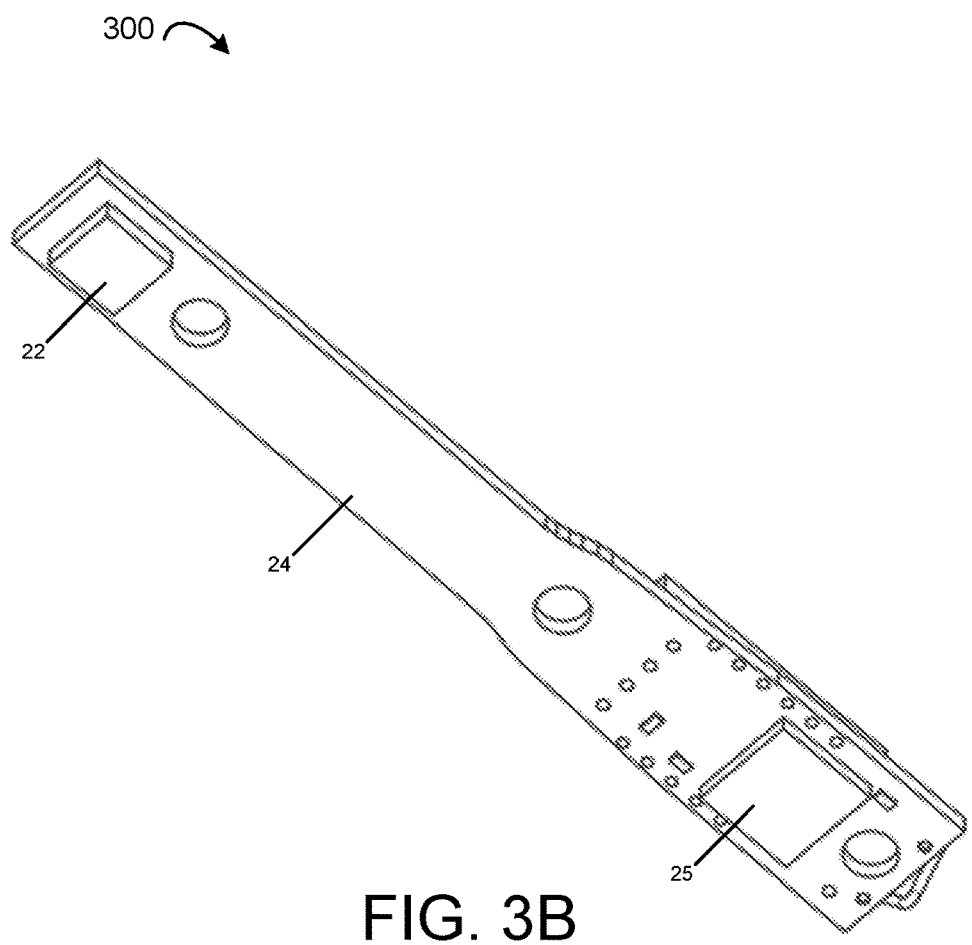
FIG. 3B depicts a bottom view of the electronics of an embodiment of a crochet hook in accordance with the subject matter disclosed herein.

FIGS. 3A and 3B depict top and bottom views, respectively, of the electronics of the crochet hook 100, namely the button 20 for incrementing or decrementing the stich counter, the row button 22 for incrementing or decrementing the row counter, the display 16, the printed circuit board 24, the forward battery contact 26, and the hardware device 25.

Each of the foregoing components may be electrically coupled to the printed circuit board 24 and interconnected using various pins and electrical lines. The display 16 may include a liquid crystal display, or the like. The hardware device 25 may include a processor, a hardware chip, a programmable hardware device such as a field-programmable gate array ("FPGA") or an application-specific integrated circuit ("ASIC"), and/or the like. As mentioned above, the hardware device 25 manages the stitch and row counters based on actuation of the stitch and row buttons 20, 22 and is electrically coupled to the display 16 to cause the values of the stich and row counters to be presented on the display 16.

In some embodiments, the hardware device 25 is coupled to a non-volatile storage device such as a flash storage device to access and persistently store the values of the row and stitch counters such that when the crochet hook 100 is turned off, the values of the row and stitch counters are not lost. Accordingly, when the crochet hook is turned on or activated, the hardware device 25 accesses the non-volatile storage device to read the row and stitch counter values, load them in a volatile memory (e.g., a processor cache or register), and display the values on the display 16. In certain embodiments, the hardware device 25 stores the counter values for a number of rows such as the previous ten rows, twenty rows, fifty rows, or the like.

Figure 4:
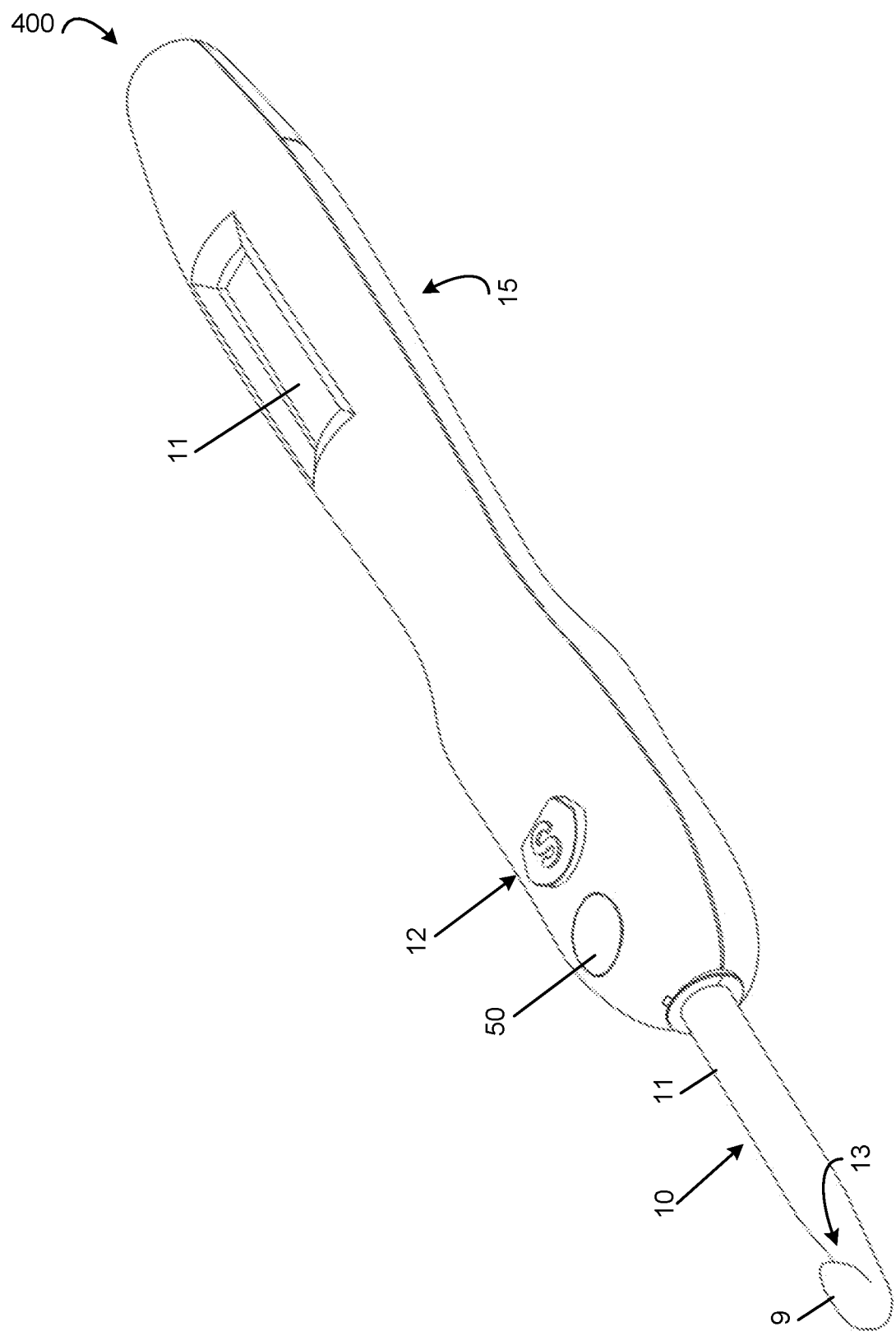
FIG. 4 depicts an elevated view of a top side of another embodiment of a crochet hook in accordance with the subject matter disclosed herein.

FIG. 4 depicts an elevated view of a top side of another embodiment of a crochet hook 400 in accordance with the subject matter disclosed herein. In one embodiment, the crochet hook 400 illustrated in FIG. 4 is substantially similar to the crochet hook 100, 200 depicted above with reference to FIGS. 1 and 2.

In one embodiment, the crochet hook 400 of FIG. 4 includes a third button 50 to selectively couple and decouple or release the elongate member 10 from the handle 15. In certain embodiments, the handle 15 is configured to receive various elongate rods 10 that each have different hooks 9 (e.g., hooks of different sizes, configurations, shapes, or the like). In such an embodiment, elongate members 10 with different hooks 9 can be inserted and locked into the handle 15 by screwing the elongate member 10 into the handle 15, using a click fit, using a friction fit, and/or the like, which may be released using the release button 50.

Figure 5:
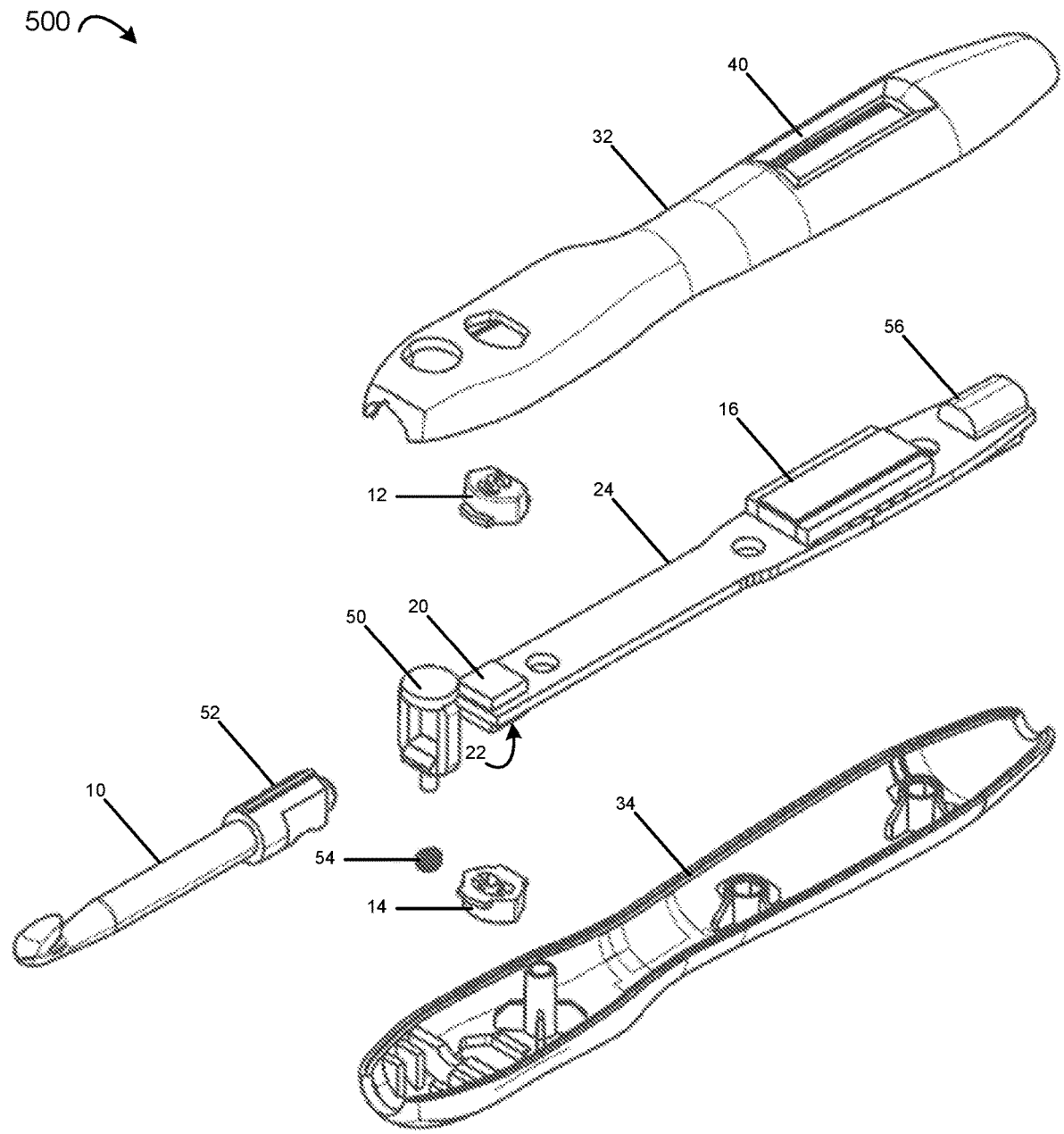
FIG. 5 depicts an exploded view of another embodiment of a crochet hook in accordance with the subject matter disclosed herein.

FIG. 5 depicts an exploded view of another embodiment of a crochet hook 500 in accordance with the subject matter disclosed herein. In one embodiment, the crochet hook 500 includes a release button 50 that is actionable using one or more springs 54 for coupling and releasing elongate members 10 using an adapter 52. In certain embodiments, the adapter 52 is inserted into the release button 50 to couple and lock the elongate member 10 to the handle 15. The release button 50 can be pressed to actuate the spring and cause the elongate member to release from the handle via the release button 50.

In certain embodiment, the crochet hook 500 includes a charging port 56 for a rechargeable battery that is used to power the circuit board 24 and the components electrically coupled to the circuit board 24 such as the display 16, the hardware device 25, and/or the like.

Figure 6A:
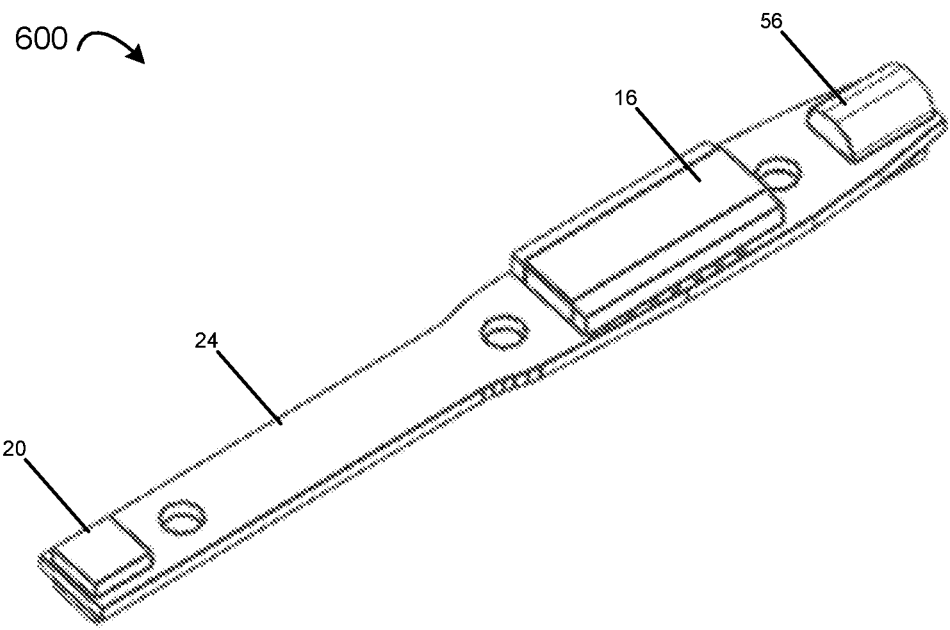
FIG. 6A depicts a top view of the electronics of another embodiment of a crochet hook in accordance with the subject matter disclosed herein.
Figure 6B:
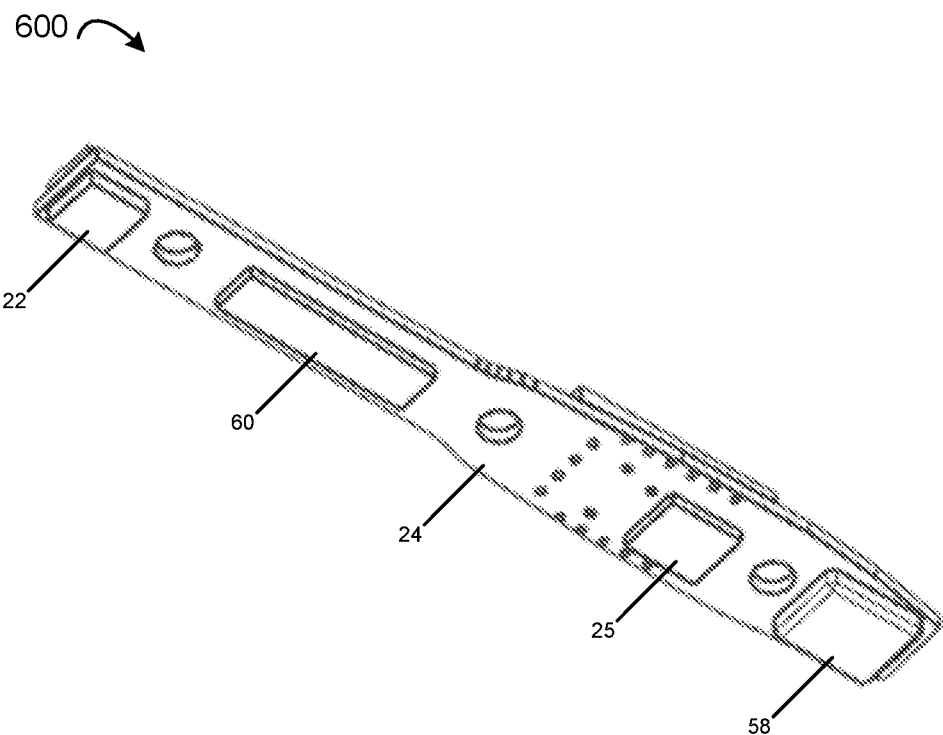
FIG. 6B depicts a bottom view of the electronics of another embodiment of a crochet hook in accordance with the subject matter disclosed herein.

FIGS. 6A and 6B depict top and bottom views, respectively, of the electronics of the crochet hook 400. The electronics for the crochet hook 400 illustrated in FIGS. 6A and 6B may be substantially similar to the electronics illustrated in FIGS. 3A and 3B. Furthermore, the electronics may further include a rechargeable battery 58, such as a lithium-ion battery that is rechargeable using a recharging port 56 using a USB cable, or the like.

The electronics may further include a network module 60, chip, device, or the like for communicating with other computing devices over a data network. The network module 60 may include a wireless module such as a Wi-Fi module, a local wireless network module, e.g., a BLUETOOTH® module, a near-field communication module, and/or the like. The network module 60 in other embodiments, includes a wired network interface for network communications over a USB bus, an ethernet bus, and/or the like.

In certain embodiments, the hardware device 25 cuts power from the rechargeable battery 58 to the electronic components in response to a period of inactivity. For instance, if the crochet hook 100, 400 is not used for a period of time (e.g., which can be detected based on sensor data, based on not receiving input from the buttons 20, 22 for a period of time, or the like) such as one minute, five minutes, or the like, the hardware device 25 may turn the display off, may cut power from the battery 58, and/or the like.

In certain embodiments, the crochet hook 400 includes sensors as part of the electrical components and electrically coupled to the hardware device 25 for sensing data such as motion data such as accelerometer data, gyroscope data, and/or the like. In such an embodiment, the row and stitch counters may be updated based on feedback from the sensors. For example, accelerometer data may be used to detect that the user completed a stitch, and the hardware device 25 may automatically increment the stitch counter. Accelerometer data may further indicate that the user moved to a new row, which would cause the hardware device 25 to automatically increment the row counter (and reset the stitch counter). Other electrical components may include a microphone, a speaker, and/or the like.

Figure 7:
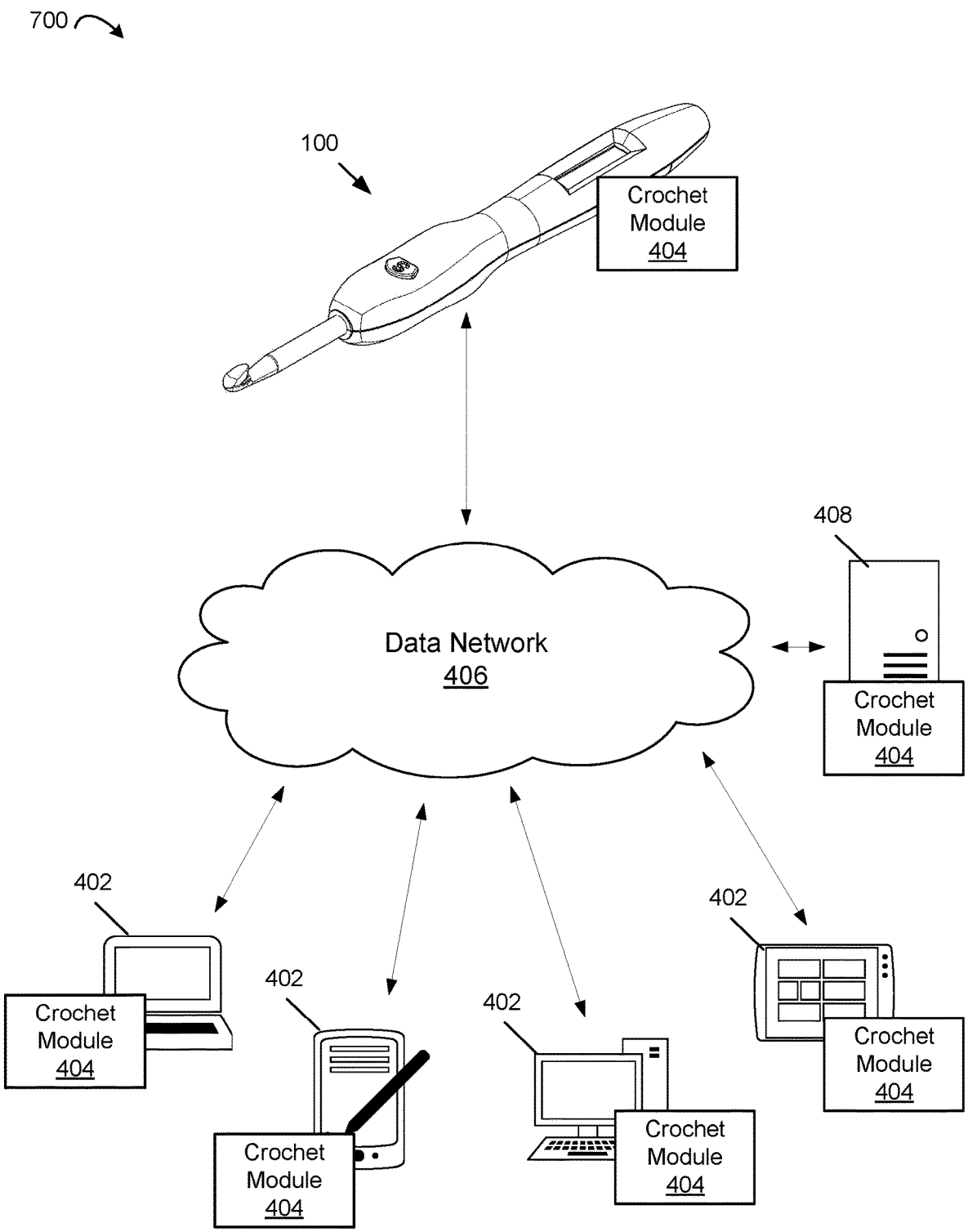
FIG. 7 depicts a schematic block diagram illustrating one embodiment of a system for a crochet hook in accordance with the subject matter disclosed herein.

FIG. 7 is a schematic block diagram illustrating one embodiment of a system 700 for a smart crochet hook. In one embodiment, the system 700 includes a smart crochet hook 100, one or more information handling devices 402, one or more crochet modules 404, one or more data networks 406, and one or more servers 408. In certain embodiments, even though a specific number of information handling devices 402, crochet modules 404, data networks 406, and servers 408 are depicted in FIG. 4, one of skill in the art will recognize, in light of this disclosure, that any number of information handling devices 402, crochet modules 404, data networks 406, and servers 408 may be included in the system 700 for a smart crochet hook.

In one embodiment, the system 700 includes one or more information handling devices 402. The information handling devices 402 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the crochet hook 100, 400 is communicatively coupled to one or more other information handling devices 402 and/or to one or more servers 408 over a data network 406, described below. The information handling devices 402, in a further embodiment, are configured to execute various programs, program code, applications, instructions, functions, and/or the like, which may access, store, download, upload, display, present, and/or the like data located locally or on one or more servers 408, such as crochet patterns, video files, audio files, and/or the like.

In one embodiment, the crochet module 404 is configured to receive a crochet pattern, e.g., from a server 408, from the Internet, or the like, provide one or more crochet instructions to a user (e.g., visually or audibly) to complete the crochet pattern using the crochet hook 100, 400, and track the user's progress through the crochet pattern based on the row and stitch count entered by the user on the crochet hook 100,

400. The crochet module 404, including its various submodules, may be located on the crochet hook 100, 400, one or more information handling devices 402 in the system 700, one or more servers 408, one or more network devices, and/or the like.

In various embodiments, the crochet module 404 may be embodied as a hardware appliance that can be installed or deployed on or within the crochet hook 100, 400, an information handling device 402, on a server 408, or elsewhere on the data network 406. In certain embodiments, the crochet module 404 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., a local wireless connection such as BLUETOOTH®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the crochet module 404 may include a power interface, a wired and/or wireless network interface, a graphical interface that attaches to a display, and/or a semiconductor integrated circuit device as described below, configured to perform the functions described herein with regard to the crochet module 404.

The crochet module 404, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the crochet module 404 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the crochet module 404.

The semiconductor integrated circuit device or other hardware appliance of the crochet module 404, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the crochet module 404 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 406, in one embodiment, includes a digital communication network that transmits digital communications. The data network 406 may include a wireless network, such as a wireless cellular network, a local wireless network, such as a Wi-Fi network, a local wireless network, e.g., a BLUETOOTH® network, a near-field communication ("NFC") network, an ad hoc network, and/or the like. The data network 406 may include a wide area network ("WAN"), a storage area network ("SAN"), a local area network (LAN), an optical fiber network, the internet, or other digital communication network. The data network 406 may include two or more networks. The data network 406 may include one or more servers, routers, switches, and/or other networking equipment. The data network 406 may also include one or more computer readable storage media, such as a hard disk drive, an optical drive, non-volatile memory, RAM, or the like.

The one or more servers 408, in one embodiment, may be embodied as blade servers, mainframe servers, tower servers, rack servers, and/or the like. The one or more servers 408 may be configured as a mail server, a web server, an application server, an FTP server, a media server, a data server, a web server, a file server, a virtual server, and/or the like. The one or more servers 408 may be communicatively coupled (e.g., networked) over a data network 106 to the crochet hook 100, 400, the one or more information handling devices 402, and/or the like. The one or more servers 408 may store and make accessible data associated with the crochet hook 100, 400, such as crochet patterns, row and stitch count information, historical crocheting information, and/or the like.

Figure 8:
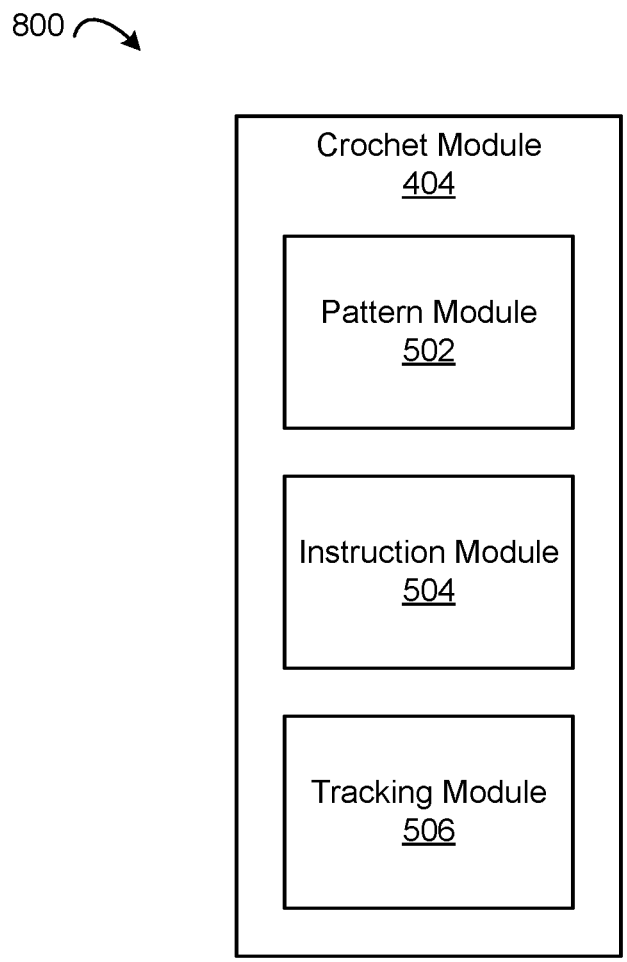
FIG. 8 depicts a schematic block diagram illustrating one embodiment of a module for a crochet hook in accordance with the subject matter disclosed herein.

FIG. 8 depicts a module 800 for a smart crochet hook. In one embodiment, the module 800 includes an instance of a crochet module 404. The crochet module 404, in one embodiment, includes a pattern module 502, an instruction module 504, and a tracking module 506, which are described in more detail below.

The pattern module 502, in one embodiment, receives a crochet pattern. The crochet pattern may be stored on a server, may be located in the cloud, may be downloadable from the Internet, may be stored locally on an information handling device 402, or the like. In some embodiments, the pattern module 502 may be located on an information handling device 402, such as a smart phone, that is communicatively coupled to the crochet hook 100, 400. In such an embodiment, the pattern module 502 may present or display the crochet pattern on the information handling device 402 for the user to view and follow as the user crochets the pattern.

The pattern module 502 may present a plurality of patterns to the user that are available in a pattern repository, such as an online or local database of crochet patterns. Crochet patterns may be stored in a code-like format that may not be readable or useable by a user. As such, in one embodiment, the pattern module 502 may be configured to translate a crochet pattern's format to a readable or usable form. The pattern module 502 may allow a user to create and upload a pattern to the repository. When creating a pattern, the pattern module 502 may provide pre-generated stitches, patterns, icons, or the like that the user can select to include in the pattern. The user may then upload the pattern to the pattern repository.

Each pattern available to the user may include metadata about the pattern, such as a difficulty level, an estimated time to complete the pattern, the types of stitches contained in the pattern, the recommended yarn, colors, ply, and amount of material, as well as any additional materials required to complete the pattern.

The instruction module 504, in one embodiment, provides crochet instructions to the user for completing the crochet pattern that the pattern module 502 received. In one embodiment, the instruction module 504 provides step-by-step audio and/or video instructions on an information handling device 402 to complete a selected crochet pattern. For example, the instruction module 504 may provide audio instructions to instruct the user which row and stitch they should be at. In certain embodiments, the instruction module 504 receives row and stitch count information from the crochet hook 100, 400, over a wireless connection, in response to the user incrementing or decrementing the stitch and/or row counter. Based on the row and stitch count information, the instruction module 504 may instruct the user of the next stitch and/or the next row.

Furthermore, in some embodiments, the instruction module 504 may provide a video, a GIF, or the like, of the stitch that the user is currently on to teach the user how to perform the stitch. In some embodiments, the instruction module receives motion information from the crochet hook 100, 400, e.g., via motion sensors coupled to the crochet hook 100, 400. If the instruction module 504 detects that the user has paused crocheting, based on the motion data or based on not receiving row/stitch count information from the crochet hook 100, 400 for a predetermined period of time, the instruction module 504 may present a video, GIF, animation, or the like on a display of an information handling device 402 of how the stitch is performed, or images of how the crochet pattern should look at the current point where the user is in the crochet pattern, or the like.

In some embodiments, the instruction module 504 may suggest row and stitch locations that may be good stopping points for larger crochet patterns. In one embodiment, the instruction module 504 may provide, calculate, or otherwise determine an amount of time to reach the stopping points based on historical usage data, described below, e.g., the user's stitch rate or average amount of time to complete a stitch.

The tracking module 506, in one embodiment, tracks the user's progress through the crochet pattern based on the row and stitch count received from the crochet hook 100, 400. In one embodiment, the tracking module 506 may indicate to the user how many stitches remain until the next row and may provide feedback, such as an audio cue, a video cue, or the like, when the user reaches the next row.

In a further embodiment, the tracking module 506, based on the row and stitch information received from the crochet hook 100, 400, may present a percentage of how much of the crochet pattern has been completed, a percentage of how much of the crochet pattern remains, or the like. Furthermore, the tracking module 506 may track historical usage data based on the usage of the crochet hook 100, 400, such as an amount of time that it is used, how long it takes a user to complete a row that contains a certain number of stitches, or the like. Historical usage data may be derived from data received from motion sensors, accelerometers, the user interacting with the row 14 and stitch 12 buttons, or the like. Accordingly, based on a given crochet pattern and the historical usage data, the tracking module 506 may provide an estimate of the amount of time it will take the user to complete the crochet pattern, the amount of time left to complete the crochet pattern, and/or the like.

Figure 9:
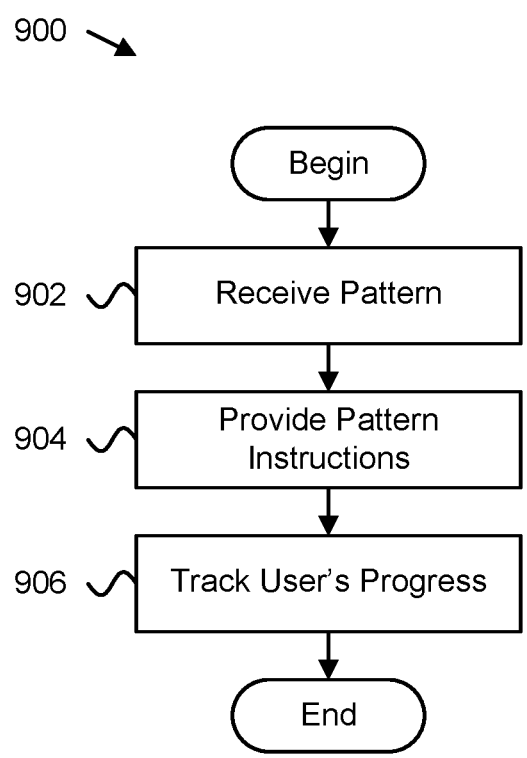
FIG. 9 depicts a schematic block diagram illustrating one embodiment of a method for a crochet hook in accordance with the subject matter disclosed herein.

FIG. 9 depicts a method 900 for using a smart crochet hook. In one embodiment, the method 900 begins and receives 902 a crochet pattern. The method 900, in some embodiments, provides 904 instructions/directions for the pattern to a user. The method 900, in a further embodiment, tracks 906 a user's progress through the pattern in response to row and stitch count data received from the smart crochet hook 100, 400, and the method 900 ends. In one embodiment, the pattern module 502, the instruction module 504, and the tracking module 506 perform the various steps of the method 900.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a handle;
   an elongate rod comprising a first end and a second end, the first end comprising an adapter that is coupled to the handle and the second end comprising a hook that is pointed with a lateral groove behind the hook;
   a first button disposed on a top side of the handle, the first button configured to increment a stitch counter when actuated;
   a second button disposed on a bottom side of the handle opposite the first button, the second button configured to increment a row counter when actuated;
   a release button disposed on the handle, the release button configured to receive the adapter coupled to the first end of the elongate rod to couple and lock the elongate rod to the handle, the release button actionable to unlock the first end of the elongate rod from the handle so that the first end of the elongate rod can be removed from the handle; and
   a display disposed on the handle for displaying a value of the stitch counter and a value of the row counter,
   wherein the stitch counter and the row counter are reset in response to the first button and the second button being pressed together.

2. The apparatus of claim 1, wherein the handle is configured to receive various elongate rods each with a different hook on the second end.

3. The apparatus of claim 1, further comprising a hardware device disposed within the handle and electrically coupled to the first button, the second button, and the display, the hardware device configured to dynamically update the display with values of the stitch and row counters in response to actuation of one of the first button and the second button.

4. The apparatus of claim 3, wherein the hardware device is configured to reset the row counter in response to actuation of the first button.

5. The apparatus of claim 3, further comprising a battery disposed within the handle and electrically coupled to the display and the hardware device for powering the display and the hardware device.

6. The apparatus of claim 5, wherein the hardware device is configured to cut power from the battery to the display and the hardware device after a predefined period of inactivity.

7. The apparatus of claim 6, wherein the hardware device is configured to store the values in the stitch and row counters in a non-volatile storage prior to power from the battery being cut, the stored values being accessed and presented on the display in response to the display being activated.

8. The apparatus of claim 6, wherein the hook comprises a crochet hook configured to interlock strands of material in rows of stitches according to a predefined pattern.

9. The apparatus of claim 8, wherein the row counter is configured to track a current row number of the predefined pattern and the stitch counter is configured to track a current stitch of the current row.

10. The apparatus of claim 6, further comprising one or more sensors for tracking movements of the hook, wherein the row counter and/or the stitch counter are updated based on the movements of the hook.

11. A system, comprising:
- a crochet apparatus, comprising:
  - a handle;
  - an elongate rod comprising a first end and a second end, the first end comprising an adapter that is coupled to the handle and the second end comprising a hook that is pointed with a lateral groove behind the hook;
  - a first button disposed on a top side of the handle, the first button configured to increment a stitch counter when actuated and decrement the stitch counter in response to a predefined button interaction;
  - a second button disposed on a bottom side of the handle opposite the first button, the second button configured to increment a row counter when actuated and decrement the row counter in response to a predefined button interaction;
  - a release button disposed on the handle, the release button configured to receive the adapter coupled to the first end of the elongate rod to couple and lock the elongate rod to the handle, the release button actionable to unlock the first end of the elongate rod from the handle so that the first end of the elongate rod can be removed from the handle; and
  - a display disposed on the handle for displaying a value of the row counter and a value of the stitch counter; and
- a computing device communicatively coupled to the crochet apparatus over a data network.

12. The system of claim 11, wherein the data network comprises a wireless communication network between the crochet apparatus and the computing device, the wireless communication network comprising a local wireless network.

13. The system of claim 11, further comprising a pattern module that:
- receives, at the computing device, a predefined crochet pattern defining the rows and stiches in each row for the crochet pattern; and
- presents the crochet pattern on the computing device for a user to view and follow while crocheting the predefined pattern.

14. The system of claim 13, further comprising an instruction module that provides audio and/or video instructions to the user using the computing device for completing the predefined crochet pattern.

15. The system of claim 14, wherein the instruction module receives the values of the row counter and the stitch counter and based on the values of the row counter and the stitch counter, provides instructions for completing the next stitch in the predefined crochet pattern.

16. The system of claim 13, further comprising a tracking module that tracks the user's rate of completing a stitch for the predefined crochet pattern based on when the row counter and/or the stitch counter is updated.

17. The system of claim 16, wherein, based on the user's rate of completing a stitch, the tracking module estimates an amount of time for the user to complete the predefined crochet pattern.

18. The system of claim 16, wherein the tracking module, based on the values of the row counter and the stitch counter, determines and presents how many stitches are remaining to complete the current row of the predefined crochet pattern.

19. A crochet hook device, comprising:
- a handle;
- an elongate rod comprising a first end and a second end, the first end comprising an adapter that is coupled to the handle and the second end comprising a hook that is pointed with a lateral groove behind the hook;
- a first button disposed on a top side of the handle, the first button configured to increment a stitch counter when actuated and decrement the row counter in response to a predefined button interaction;
- a second button disposed on a bottom side of the handle opposite the first button, the second button configured to increment a row counter when actuated and decrement the row counter in response to a predefined button interaction;
- a display disposed on the handle for displaying a value of the first row counter and a value of the stitch counter;
- a third button disposed on the handle, the third button configured to receive the adapter coupled to the first end of the elongate rod to couple and lock the elongate rod to the handle, the release button actionable to unlock the first end of the elongate rod from the handle so that the first end of the elongate rod can be removed from the handle, the handle configured to receive various elongate rods each with a different hook on the second end;
- a hardware device disposed within the handle and electrically coupled to the first button, the second button, and the display, the hardware device configured to dynamically update the display with the values of the row and stitch counters in response to actuation of one of the first button and the second button; and
- a battery disposed within the handle and electrically coupled to the display and the hardware device for powering the display and the hardware device,
- wherein the row counter and the stitch counter are reset in response to the first button and the second button being pressed together.

* * * * *